Mar. 13, 1923.          1,448,544.
G. JESSE.
POULTRY NEST.
FILED SEPT. 1, 1920.
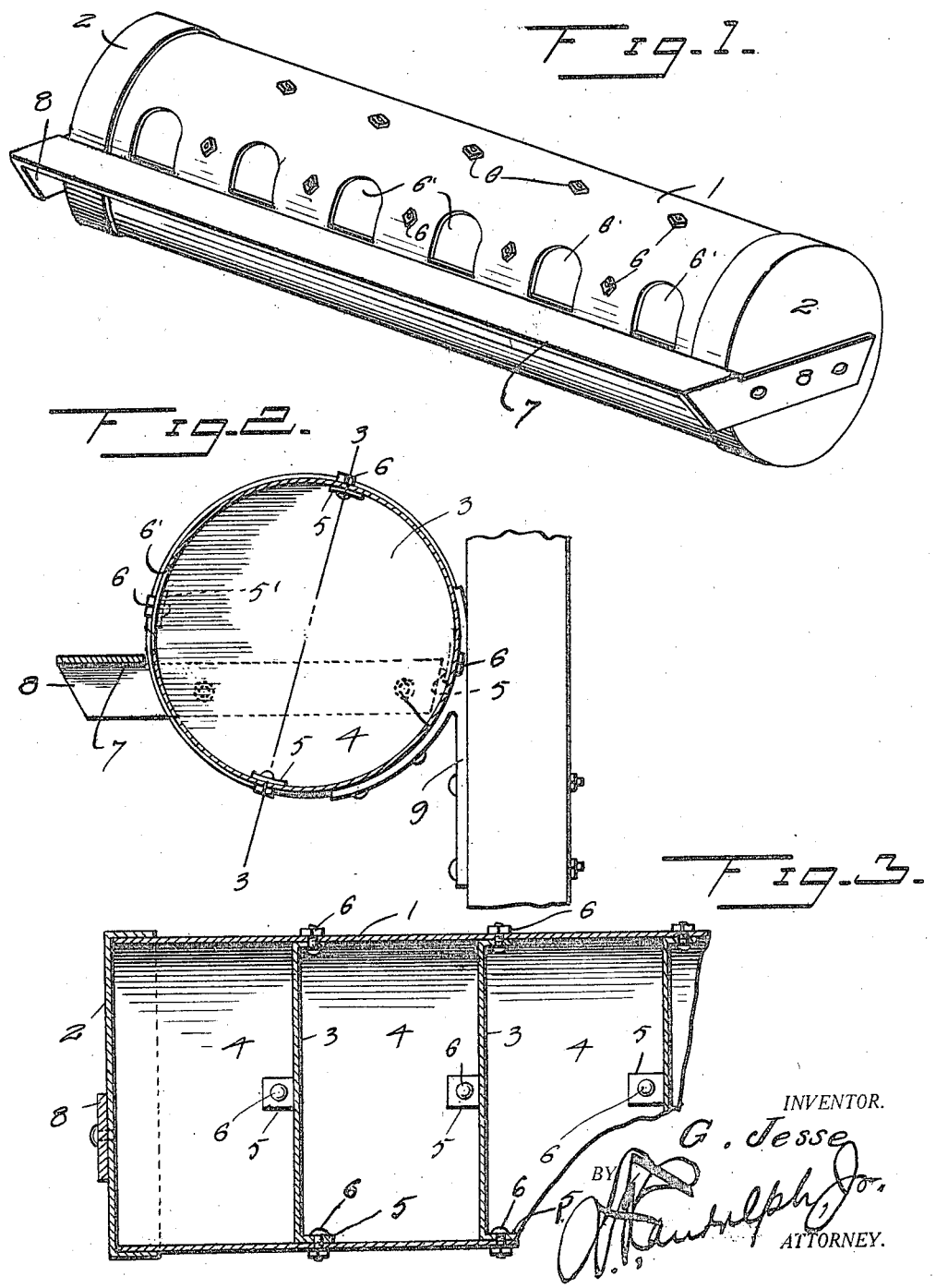
INVENTOR.
G. Jesse
BY
ATTORNEY.

Patented Mar. 13, 1923.

1,448,544

UNITED STATES PATENT OFFICE.

GUSTAVE JESSE, OF WRAY, COLORADO.

POULTRY NEST.

Application filed September 1, 1920. Serial No. 407,353.

*To all whom it may concern:*

Be it known that I, GUSTAVE JESSE, a citizen of the United States, residing at Wray, in the county of Yuma and State of Colorado, have invented certain new and useful Improvements in Poultry Nests; and I do hereby declare the following to be a full, clear, and exact description of the invention, such as will enable others skilled in the art to which it appertains to make and use the same.

This invention relates to new and useful improvements in poultry nests and the primary object is to provide a device of this character which will be substantially verminproof.

Still another object resides in constructing the invention in such manner as will prevent or discharge the poultry from sitting thereon and thus much filth and dirt which is ordinarily accumulated on nests will be eliminated.

Another object resides in the provision of a device which is constructed entirely of metal which may be quickly and readily cleansed of any dirt that may accumulate therein.

With these and other objects in view, my invention consists in the novel features of construction, combination, and arrangement of parts as will be hereinafter referred to and more particularly pointed out in the specification and claims.

In the accompanying drawings forming a part of this application,

Fig. 1 is a perspective view of my improved device applied to use,

Fig. 2 is a transverse section therethrough, and

Fig. 3 is a fragmentary longitudinal section through the same on the plane of line 3—3 of Figure 2.

In describing the invention I shall refer to the drawings in which similar reference characters designate corresponding parts throughout the several views and in which 1 designates a body of cylindrical design constructed preferably of galvanized iron, to the ends of which are secured the end pieces or cap-like members 2. Secured within the cylindrical body 1 at regular intervals therein are the partition walls 3 which are so placed as to provide a plurality of compartments 4 within said body. The partition walls 3 are each provided with a plurality of integral extensions or lugs 5 which enable said partition walls to be secured to the inner wall of the cylinder or body 1 through the medium of the bolts and nuts designated in the drawings as 6. The end pieces 2 hereabove described are also removably secured in position on the body 1 and by so removably securing the partition walls and said end pieces it will be seen that the same may be quickly and readily removed for the cleansing of the interior of the body when desired. The wall or body 1 is provided at regular intervals with openings 6, one for each compartment 4 and extending longitudinally of the body 1 just below the openings 6 is a strip 7 forming a perch, to the ends of which are the angular supporting arms or strips 8, the latter being removably secured to the end pieces or members 2. Any means may be provided for the supporting of this nest but I prefer to illustrate the same as being secured to a post or other similar support. In connection with this means of support, I have shown a bracket 9 which is adapted to engage the support and be removably secured to the rear of the body 1.

From the foregoing, it will be seen that I have provided a poultry nest which is verminproof and which may be readily cleansed and washed when desired. It will also be seen that it is of simple construction, inexpensive to manufacture and one which will be very efficient in use.

Having thus described my invention what I claim is:—

1. A nest of the class described comprising a cylindrical body, end closures for said body, a perch member carrying said closures, and said closures being mounted on said body for axial movement whereby said perch member may be moved to block the entrance to said body.

2. A nest of the class described including a cylindrical body, end closures having cylindrical walls to slidingly receive the ends of said body, a perch extending exteriorly and longitudinally of said body, said perch being removably secured to said closures, and said closures being rotatable on said body whereby the perch may be moved to block the entrance to said body.

In testimony whereof I affix my signature in presence of two witnesses.

GUSTAVE JESSE.

Witnesses:
J. G. JONES,
CLYDE E. CUNNINGHAM.